United States Patent
Kifer et al.

(10) Patent No.: US 6,367,857 B2
(45) Date of Patent: Apr. 9, 2002

(54) REMOVABLE CONSOLE ASSEMBLY FOR A MOTOR VEHICLE

(75) Inventors: Harlan E Kifer, Bloomfield Hills; Mark C Miner, Oxford; Thomas W Modick, Novi, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/746,378

(22) Filed: Dec. 21, 2000

Related U.S. Application Data
(60) Provisional application No. 60/175,054, filed on Jan. 7, 2000.

(51) Int. Cl.[7] .................................................. B60P 3/05
(52) U.S. Cl. .................... 296/24.1; 296/37.8; 439/34
(58) Field of Search ............................ 296/24.1, 37.8; 439/34

(56) References Cited

U.S. PATENT DOCUMENTS

| | | | | |
|---|---|---|---|---|
| 3,692,975 A | * | 9/1972 | Markus et al. | 219/202 |
| 4,453,759 A | * | 6/1984 | Kathiria | 296/37.8 |
| 4,796,791 A | * | 1/1989 | Goss et al. | 224/275 |
| 5,316,368 A | * | 5/1994 | Arbisi | 297/194 |
| 5,338,081 A | * | 8/1994 | Young et al. | 296/37.14 |
| 5,397,160 A | * | 3/1995 | Landry | 296/37.8 |
| 5,492,068 A | * | 2/1996 | McKee | 296/37.8 |
| 5,542,589 A | * | 8/1996 | McKee | 296/37.15 |
| 5,823,599 A | * | 10/1998 | Gray | 296/37.8 |
| 5,902,009 A | | 5/1999 | Singh et al. | 297/188.1 |
| 5,934,532 A | | 8/1999 | Rausch et al. | 224/544 |
| 6,116,674 A | * | 9/2000 | Allison et al. | 296/37.8 |
| 6,135,529 A | * | 10/2000 | De Angelis et al. | 296/37.8 |
| 6,152,514 A | * | 11/2000 | McLellen | 296/37.8 |
| 6,203,088 B1 | * | 3/2001 | Fernandez et al. | 296/37.8 |
| 6,254,160 B1 | * | 7/2001 | Marriott et al. | 296/24.1 |
| 6,264,261 B1 | * | 7/2001 | Krafcik | 296/37.8 |
| 6,278,676 B1 | * | 8/2001 | Anderson et al. | 296/37.8 |

FOREIGN PATENT DOCUMENTS

| | | | |
|---|---|---|---|
| JP | 8 244535 | * | 9/1996 |
| JP | 11 321465 | * | 11/1999 |

* cited by examiner

*Primary Examiner*—Joseph D. Pape
*Assistant Examiner*—Kiran B. Patel
(74) *Attorney, Agent, or Firm*—Mark P. Calcaterra; Ralph E. Smith

(57) ABSTRACT

A removable console assembly is provided that includes an upwardly extending main body defining an inner cavity. The main body has an open upper side and first and second panels pivotally attached to the main body for providing access to the inner cavity. A locking mechanism selectively locks both the first and second panels to the main body to prevent access to the inner cavity. A mounting assembly is attached to the floor for releasably receiving the main body. A latching arrangement includes a latch extending from a bottom surface of the main body and a handle disposed within the inner cavity for manually operating the latch. An electrical connector is provided and includes a first and second portions. The first portion is carried by the mounting assembly and electrically interconnected to a battery of the motor vehicle. The second portion in selective electrical communication with the first portion for providing power to various components of the console assembly.

20 Claims, 8 Drawing Sheets

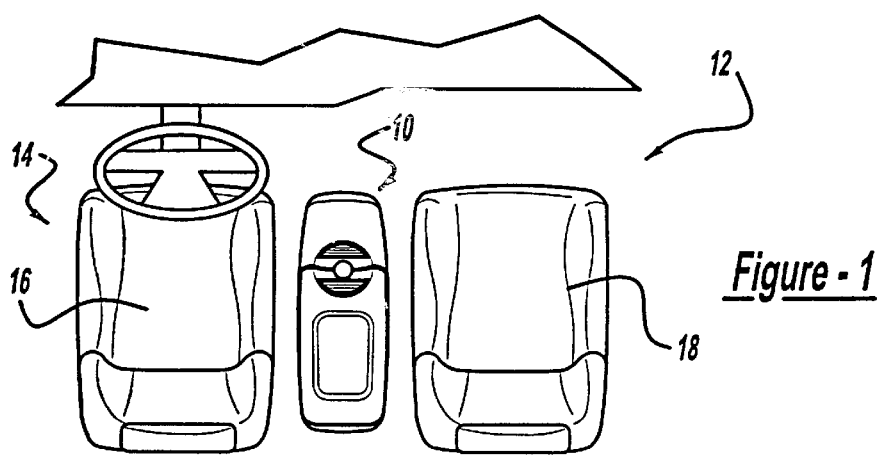
*Figure - 1*
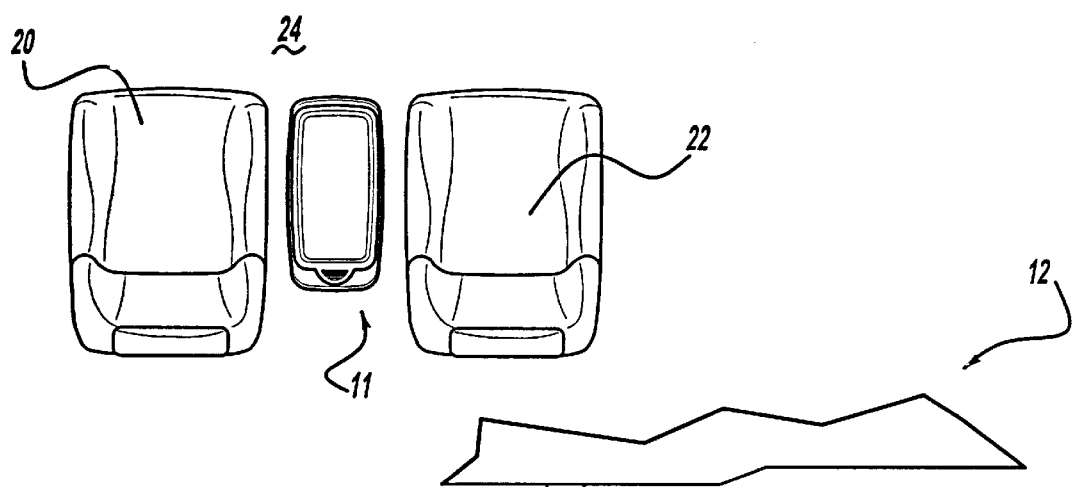
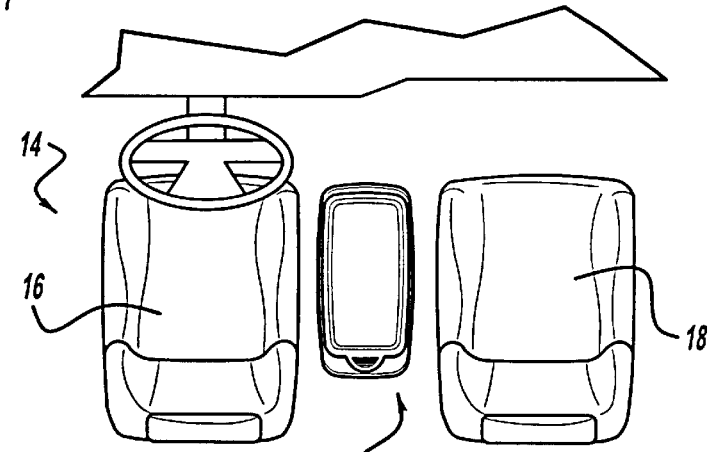
*Figure - 2*
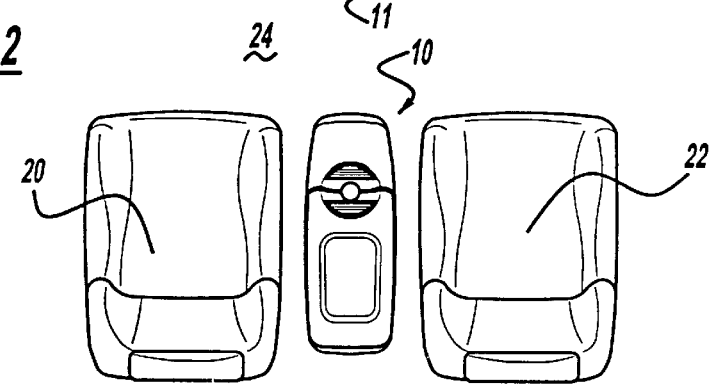

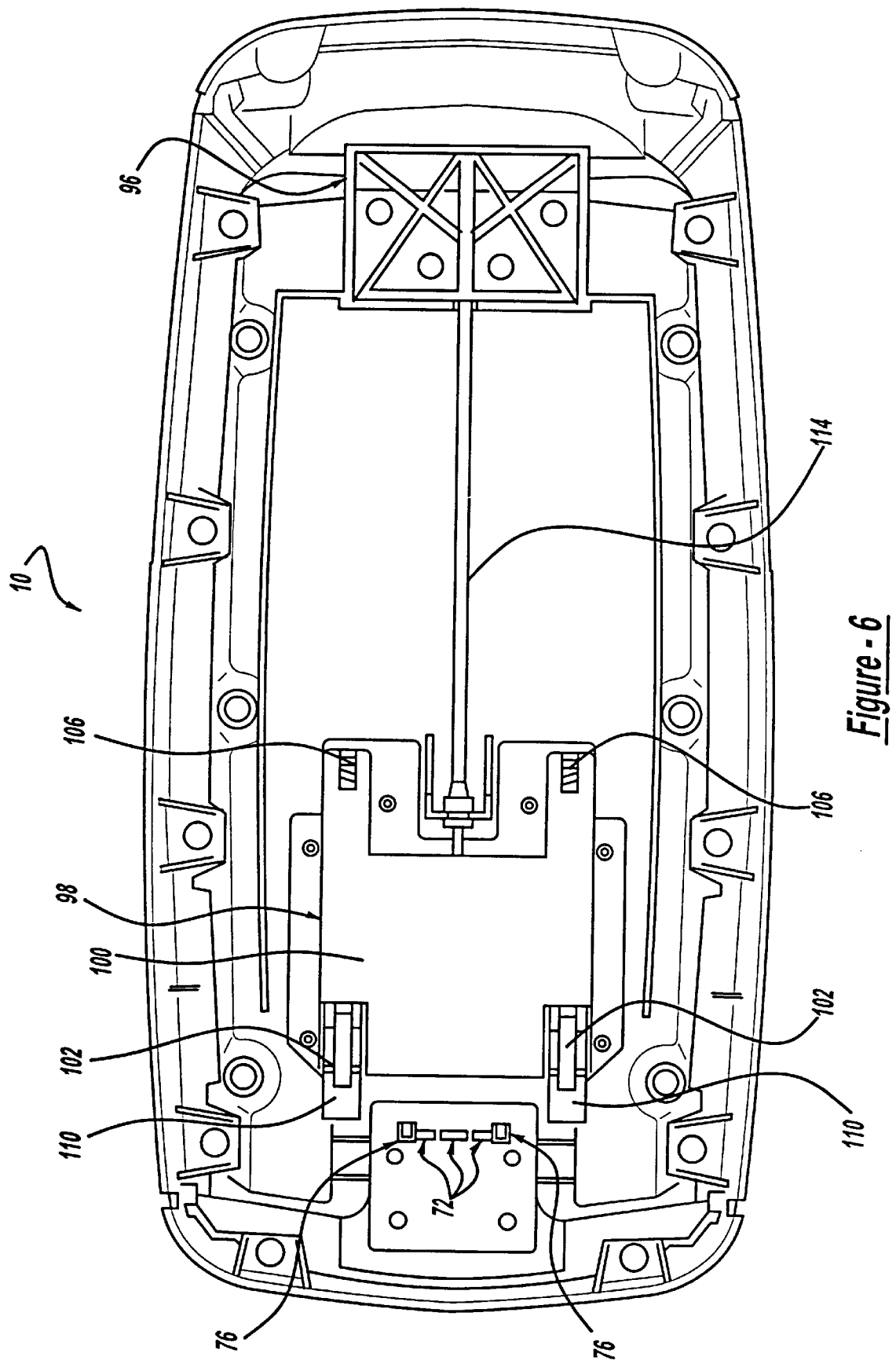

REMOVABLE CONSOLE ASSEMBLY FOR A MOTOR VEHICLE

CROSS-REFERENCE TO RELATED APPLICATION

This application claims priority to a provisional application filed Jan. 7, 2000, and assigned U.S. Ser. No. 60/175,054.

BACKGROUND OF THE INVENTION

1. Technical Field

The present invention generally pertains to motor vehicles. More particular, the present invention pertains to a removable console for a motor vehicle.

2. Discussion

The comfort and convenience of passenger vehicles has been a continuous goal of automakers. Significant features available in vehicles distinguish them from those produced by other automakers, making them more attractive for purchase by the general public. In adding such features, automakers must ensure that the overall level of product safety is maintained.

One concern for vehicle owners is the storage space available within a vehicle. To achieve added storage space, automakers have developed various consoles and other devices and methods for storage of items. However, consoles and other storage devices traditionally remain fixed to one location of a vehicle. This could limit potential interior configurations and offer the vehicle as an easier target for thieves.

By way of a non-limiting example, minivans typically have a second row of seats for additional occupants. Not only would storage space be required between the driver and the front seat passenger but also between two additional passengers in the second row of seats. As is well known, minivans are not only used as passenger vehicles but also as cargo vehicles. The rear row of seats are typically removable in order to provide space for larger cargo items. If a traditional console were to be introduced between the rear passenger seats, use of the vehicle for large cargo items would be limited, as the console is not removable. By introducing a removable console, this problem could be overcome.

By way of a second, non-limiting example, vehicle security is a concern for all vehicle owners. Particularly, vehicles with soft, convertible style tops are more susceptible to break-in, as the top can be easily torn open. Traditional storage consoles which are fixed in place, even though locked, are easily broken open once a thief has entered the vehicle. If a removable console were to be introduced, vehicle owners could take the complete console and its contents with them or temporarily locate the console in the vehicle trunk, effectively removing its access from potential thieves.

In light of the above examples and in an effort to increase comfort and convenience for vehicle occupants, it would therefore be desirable to have a storage console which is not only removable from but also re-locatable within a vehicle.

SUMMARY OF THE INVENTION

It is a general object of the present invention to provide a removable console for a motor vehicle.

In one exemplary form, the present invention provides a removable console assembly for a motor vehicle having a floor. The removable console assembly includes an upwardly extending main body portion defining an inner cavity. The main body portion has an open upper side. The removable console assembly further includes first and second panels providing access to the inner cavity. The first panel is pivotally attached to the main body portion adjacent a forward upper edge of the main body portion The second panel is pivotally attached to the main body portion adjacent a rear upper edge of the main body portion. A single locking mechanism is carried by the main body for selective locking of both of the first and second panels to the main body portion to prevent access to the inner cavity. A mounting assembly is attached to the floor releasably receiving the main body portion. A latching arrangement includes a latch extending from a bottom surface of the main body portion and a handle for manually operating the latch. The handle is disposed within the inner cavity. An electrical connector is provided including a first portion and a second portion. The first portion is carried by the mounting assembly and electrically interconnected to a battery of the motor vehicle. The second portion releasably and electrically engages the first portion. The first portion extends from the bottom side of the main body portion. A 12 volt outlet is disposed within the inner cavity and electrically connected to the first portion. A lamp is disposed within the inner cavity and electrically connected to the first portion.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 1 is a top view of a vehicle passenger compartment including a removable console assembly constructed in accordance with the teachings of a preferred embodiment of the present invention, the console assembly shown operatively mounted in a first position within the passenger compartment of the vehicle;

FIG. 2 is a top view similar to FIG. 1, illustrating the console assembly operatively mounted in a second position within the passenger compartment;

FIG. 6 is a bottom plan view of the console assembly;

DETAILED DESCRIPTION OF THE PREFERRED EMBODIMENT

Figure 3:
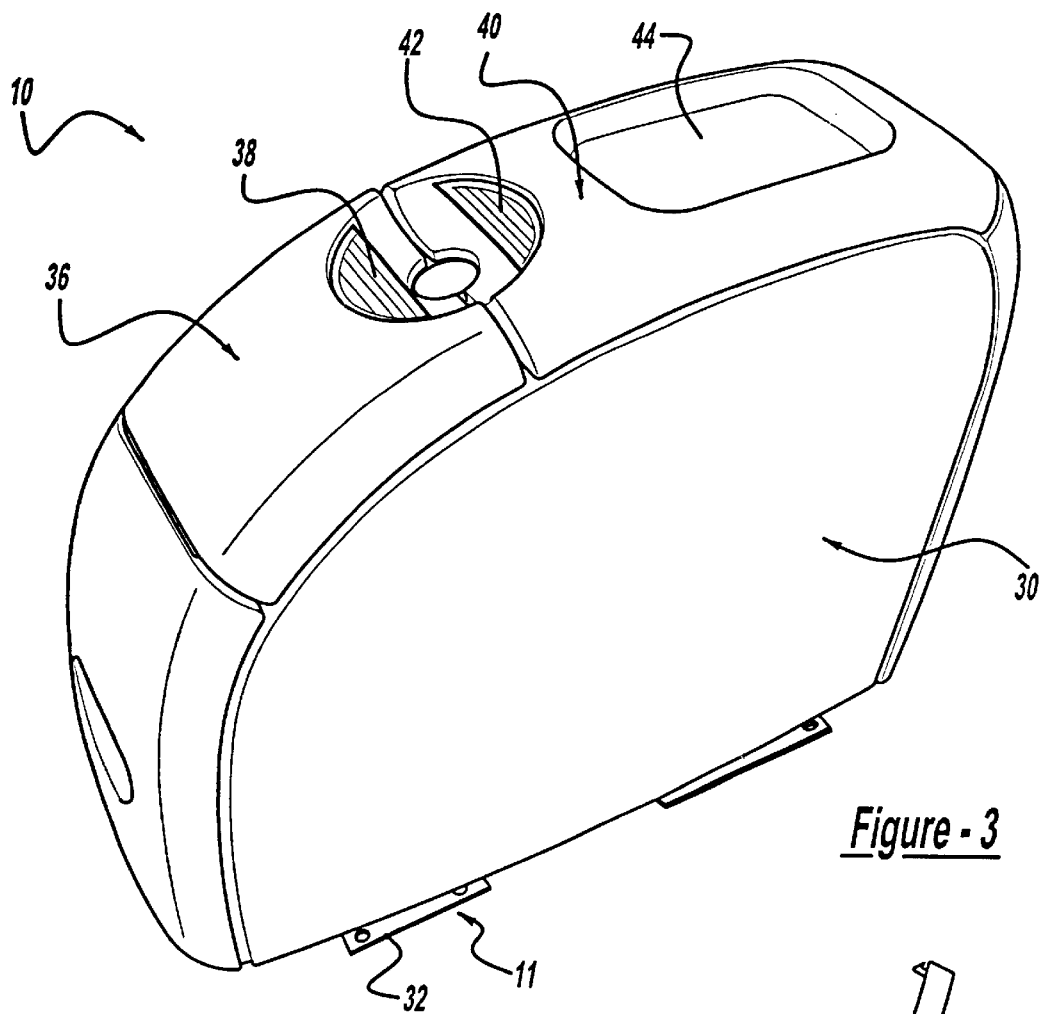
FIG. 3 is a perspective view of the console assembly of the present invention illustrated with first and second panels articulated to closed positions.

Referring generally to the figures, a removable console assembly constructed in accordance with the teachings of the preferred embodiment of the present invention is generally identified at reference numeral 10. As shown in the environmental views of FIGS. 1 and 2, console assembly 10 is particularly intended to be removably attached to a floor 24 of a motor vehicle 12.

In an exemplary embodiment, the motor vehicle 12 is shown to include a passenger compartment 14 having first and second rows of vehicle seats. The first row includes a driver seat 16 and a passenger seat 18. The second row of vehicle seats is located rearward of the passenger compartment and similarly includes a pair of seats 20 and 22. In the embodiment illustrated, the seats 16–22 are conventional bucket seats which are conventionally interconnected to a floor 24 of the motor vehicle 12.

In the environmental view of FIG. 1, the console assembly 10 is shown operatively attached to the floor 24 between the driver and passenger seats 16 and 18. In the environmental view of FIG. 2, the console assembly 10 is alternatively shown attached to the floor 24 between the seats 20 and 22 of the second row of seats.

A base unit 11 is fixedly attached to the floor 24. The base unit 11 enables selective attachment of the console assembly 10 thereto. As seen in each of FIGS. 1 and 2, the base unit 11 is accessible when the console assembly 10 is not attached thereto. Without attachment of the console assembly, the base unit 11 acts as a simple tray, described in greater detail hereinbelow.

In one application, the motor vehicle 12 is a minivan. However, it will become understood by those skilled in the art that the teachings of the present invention are applicable to various other motor vehicles including but not limited to trucks and the like.

FIG. 3 depicts a perspective view of the console assembly 10. The console 10 includes a main body 30, a first panel 36 and a second panel 40 for accessing the interior of the console assembly 10. Additionally, the first panel 36 has a latch handle 38 as well as the second panel 40 having a similar latch handle 42, each usable for opening the respective panel. The second panel 40 also forms a recessed area 44 for holding items. The console 10 is latched on top of the base unit 11 which includes a base plate 32 and a base plate cover 34 (see FIGS. 8 and 9). Base plate 32 and base plate cover 34 will be described in greater detail below.

Figure 5:
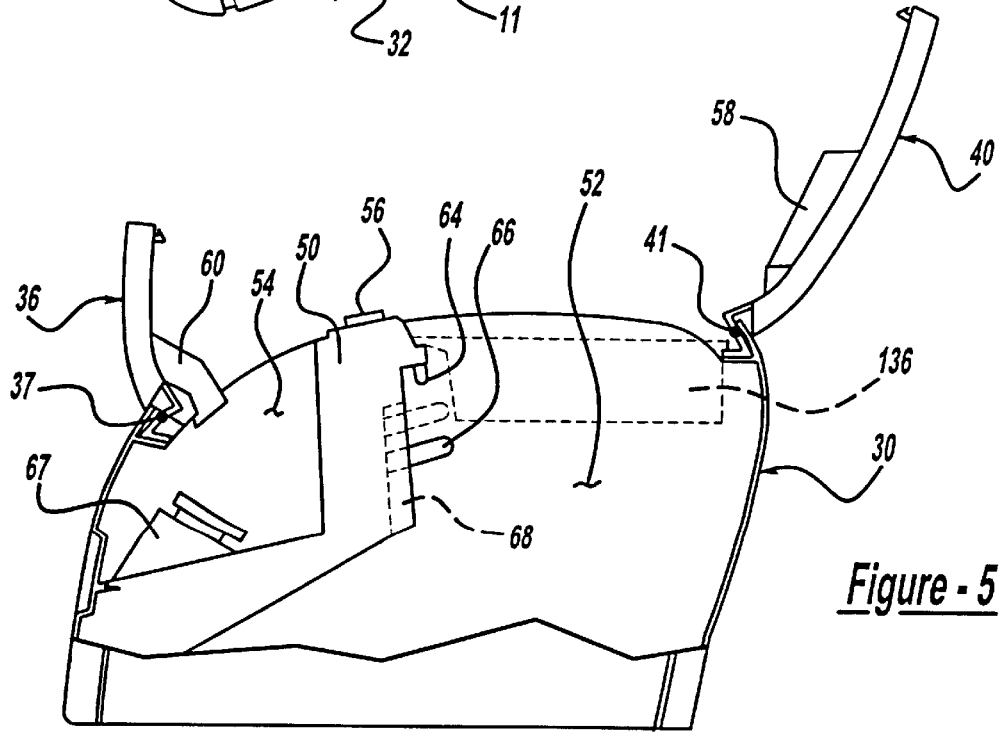
FIG. 5 is a partially cut away side view of the console assembly detailing the internal structure of the console assembly.
Figure 4:
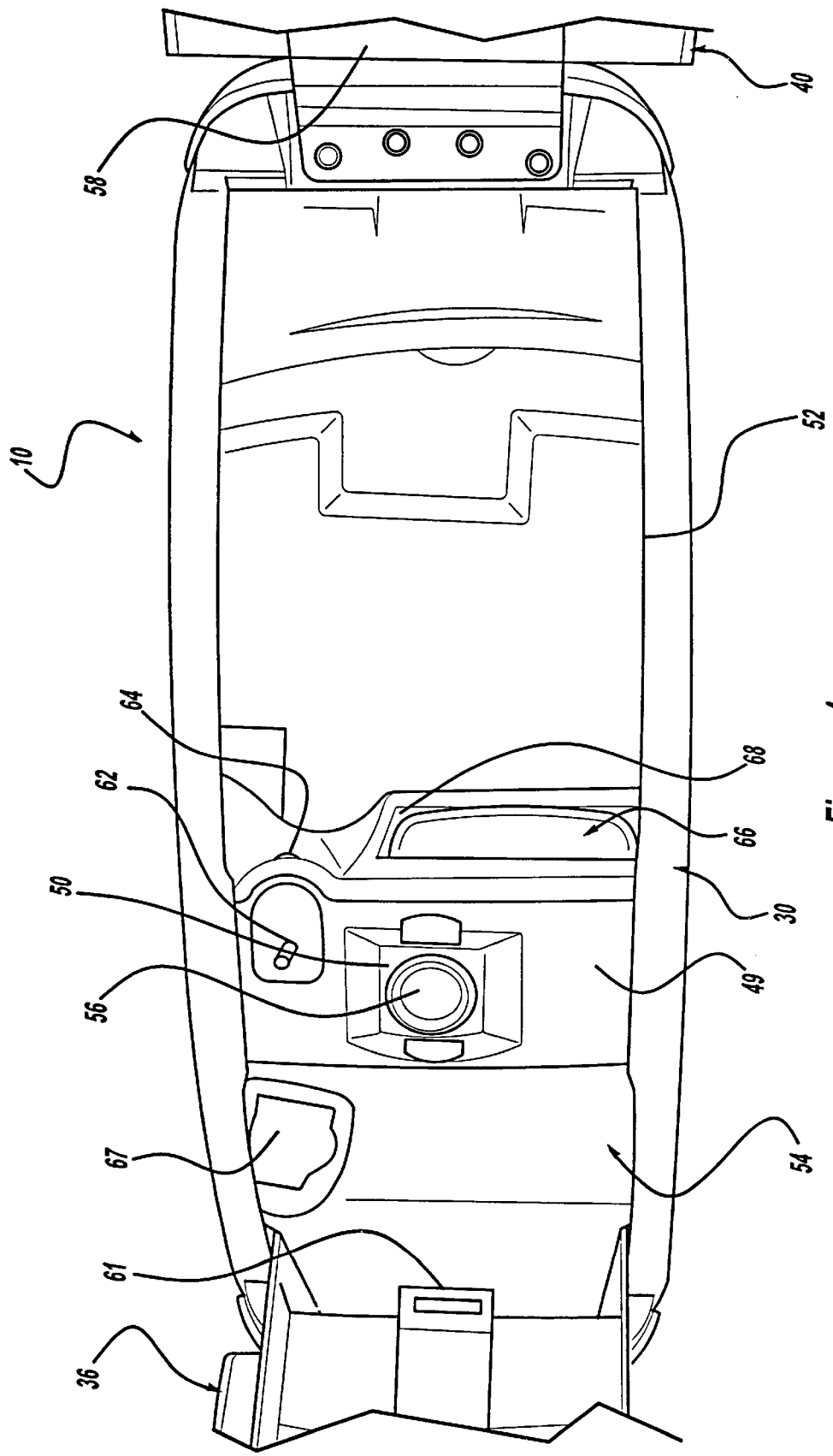
FIG. 4 is a top plan view illustrating the inside of the console assembly having the first and second panels articulated to open positions.

Both the first and second panels 36, 40 are pivotaly attached to the main body 30, by hinges 37,41 respectively, as best shown in FIGS. 4 and 5. As depicted, the first and second panels 36, 40 are in an open position. A separation wall 50 runs between the sides of the main body 30, thus forming a first cavity 52 and a second cavity 54. Integrated into the top face of the separation wall 50 is a locking mechanism 56 which is used to selectively lock the first and second panels 36, 40. A combined map and tissue holder 58 is integrated into the second panel 40 as well as the first panel 36 having a detachable cellular phone holder 60. An electrical connection 67 is disposed within the second cavity 54. The separation wall 50 also includes a light switch 62 and a corresponding light 64 that is positioned to light the first cavity 52.

A latch handle 66 is slidably connected to the separation wall 50 and is operable to detach the console 10 from the base unit 11. The latch handle 66 is connected to a release mechanism 98 (see FIG. 6), the details of which will be explained in greater detail hereinbelow. The latch handle 66 is disposed within a slot 68 and is biased in a first position. The latch handle 66 can be moved from the first position (shown) to a second position (shown in phantom) for activating the release mechanism 98, thus detaching the console 10 from the base unit 11. Because the latch handle 66 is disposed within the console 10, it is not accessible when the first and second panels 36,40 are locked.

With reference to FIG. 6, a first set of interface connectors 72 extend from a bottom face and are in electrical communication with other electrical components of the console 10. Once mounted, the first set of interface connectors 72 mate with a second set of interface connectors 74 of the base unit 11 (see FIG. 7). Additionally, posts 76 are disposed on either side of the first set of interface connectors 72 and extend downward from the bottom face of the console 10. As the console 10 is attached to the base unit 11, posts 76 act on a connector block 78 (see FIG. 7), sliding the connector block 78 from a first position to a second position completing an electrical connection between the base unit 11 and the console 10.

Figure 7:
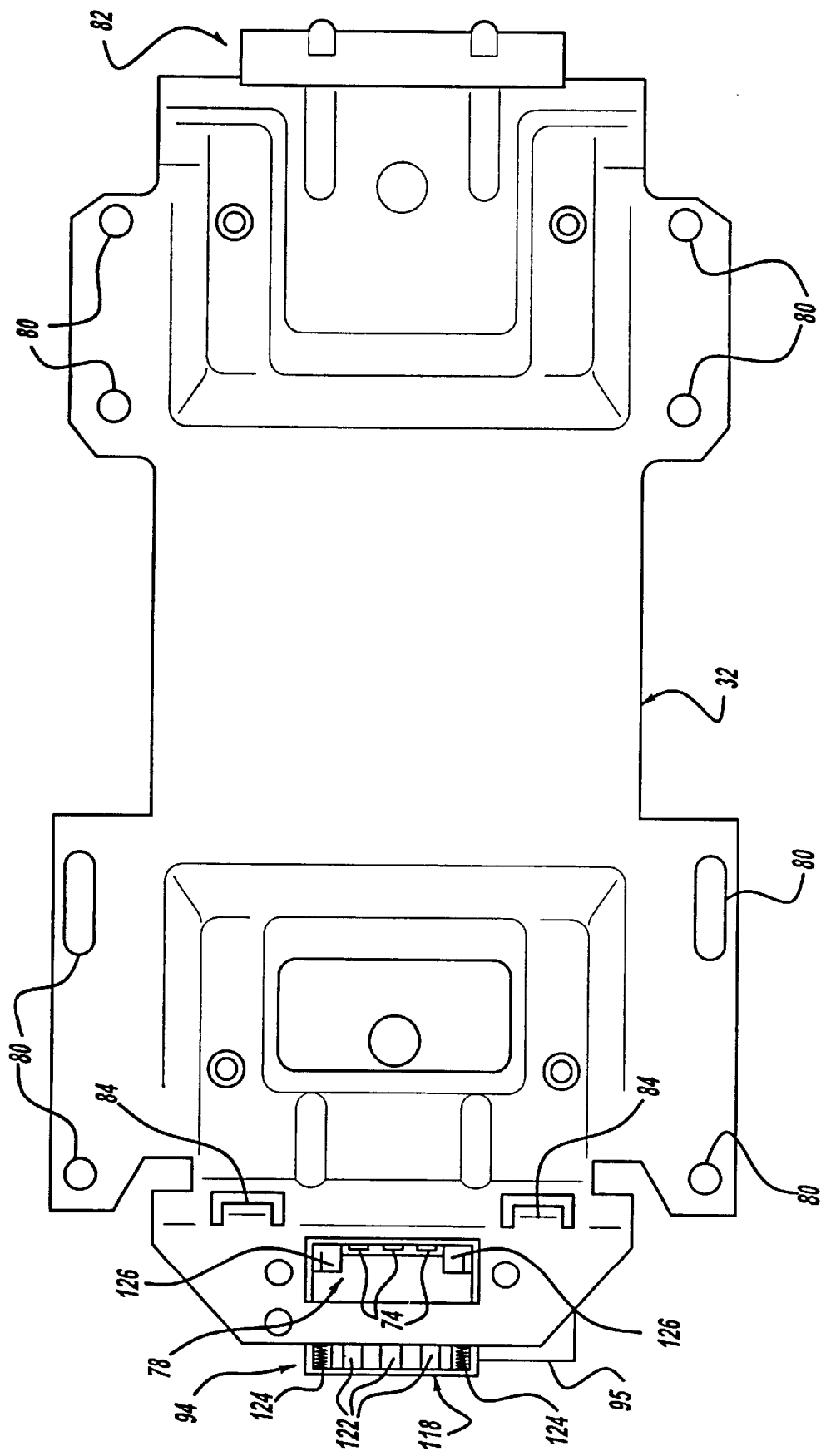
FIG. 7 is a top plan view of a mounting bracket.

The base unit 11 includes a base plate 32 and a base plate cover 34 as described earlier. The base plate cover 34 is attached to the base plate 32 via a plurality of screws extending through apertures 70. FIG. 7 shows the base plate 32 in further detail and FIG. 8 details the base cover 34. The base plate 32 is attached to the vehicle floor 24 by way of bolt or screw, through a plurality of holes 80. The base plate 32 also includes a primary latch receptor 82 and secondary latch receptors 84. The primary and secondary latch receptors 82, 84 are accessible through the base plate cover 34 through corresponding openings 80, 90. Towards a first end of the base plate 32 is an electrical connection unit 94 that includes an electrical connector 95. It should be noted that the base plate 32 is preferably in permanent electrical connection with a vehicle battery (not shown) via the electrical connector 95.

As best seen in FIG. 6, the bottom of console assembly 10 includes a primary latch 96 and a latch assembly 98 that interface with the primary latch receptor 82 and secondary latch receptors 84, respectively. The primary latch 96 can be integrally formed with the bottom of the console assembly 10 or attached thereto using any one of a number of fastening mechanisms commonly known in the art. The latch assembly 98 includes a latch plate 100 slidably attached to the bottom of the console assembly 10. The latch plate 100 includes secondary latches 102 that extend downward from the console 10. The latch plate 100 is biased in a first direction by springs 106. The secondary latches 102 each include a sloped face 110. As described previously, the latch assembly 98 is operatively attached to the latch handle 66. The preferred embodiment of the present invention includes a cable 114 that operatively interconnects the latch plate 100 and the latch handle 66. The biasing force of the springs 106 cause the latch plate 100 to pull on the cable 114, thus biasing the latch handle 66 in the first position, as described hereinabove.

In attaching the console assembly 10 to the base unit 11, initially, the primary latch 96 is received through opening 88, into the primary latch receptor 82. The console assembly 10 is then pivoted downward about the interface between the primary latch 96 and the primary latch receptor 82 until the sloped faces 110 of the secondary latches 102 rest upon a top surface 116 of the base cover 34, immediately above the openings 90. To finalize attachment, an operator pushes downward on the console assembly 10, wherein the downward movement causes the sloped faces 110 of the secondary latches 102 to ride along the top surface 116 and thus forces the latch plate 100 to slide against the biasing force of the springs 106. Having slid to a sufficient degree, the secondary latches 102 move downward past the top surface 116 and into the openings 90, latching with the secondary latch receptors 84. In this manner, the console assembly 10 is attached to the base unit 11 by the interface between the primary latch 96, the secondary latches 102 and the primary and secondary latch receptors 82, 84 respectively.

With reference to FIG. 7, the electrical connection unit 94 will now be described in detail. The electrical connection unit 94 comprises a main body 118, the connector block 78, interface connectors 74, connector rails 122 and springs 124. The connector rails 122 are in permanent electrical connection with a vehicle battery via a connector 95. The interface connectors 74 are in selective electrical connection with the connector rails 122. The connector block 78 is slidable within the main body 118 along the connector rails 122. The springs 124 bias the connector block 78 in a first position wherein the interface connectors 74 are out of electrical communication with the connector rails 122. When the console 10 is attached to the base unit 11, the connector block 78 is slid into a second position wherein the interface connectors 74 contact the connector rails 122. This is achieved by the posts 76, that extend downward from the console 10, acting on sloped surfaces 126 of the connector block 78, thus pushing the connector block 78 against the biasing force of the springs 124. The second position enables the connector block 78 to act as a bridge between the connector rails 122 and the interface connectors 74. The interface connectors 74 contact the interface connectors 72 extending from the bottom of the console 10, thus providing power to the console 10. Upon detachment of the console 10, the springs 124 again bias the connector block 78 to the first position, thus breaking the bridge between the connector rails 122 and the interface connectors 74.

Figure 8:
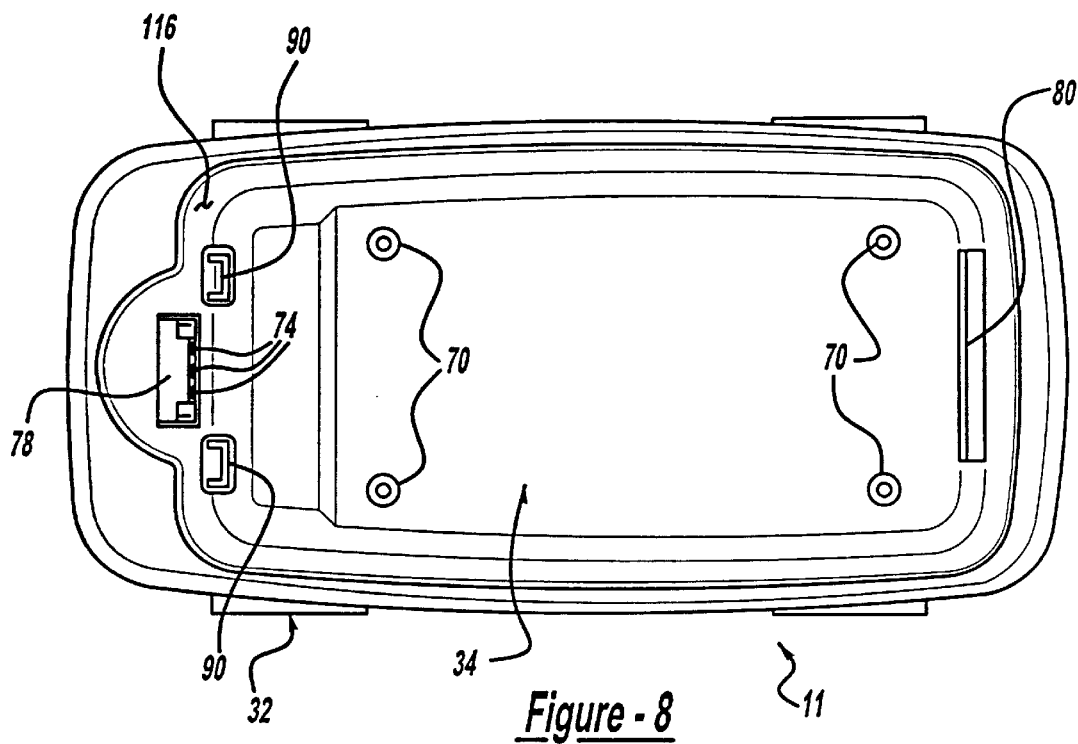
FIG. 8 is a top plan view of the mounting bracket of FIG. 7 having a bracket cover attached thereto.

As can be seen in FIG. 8, the base plate cover 34 is configured wherein only the second set of interface connectors 74 remain exposed. As a result of the above described operation of the electrical connection unit 94 vehicle occupants are safe from an electrical shock which could occur had the exposed interface connectors 74 remained in a connected state.

Figure 9:
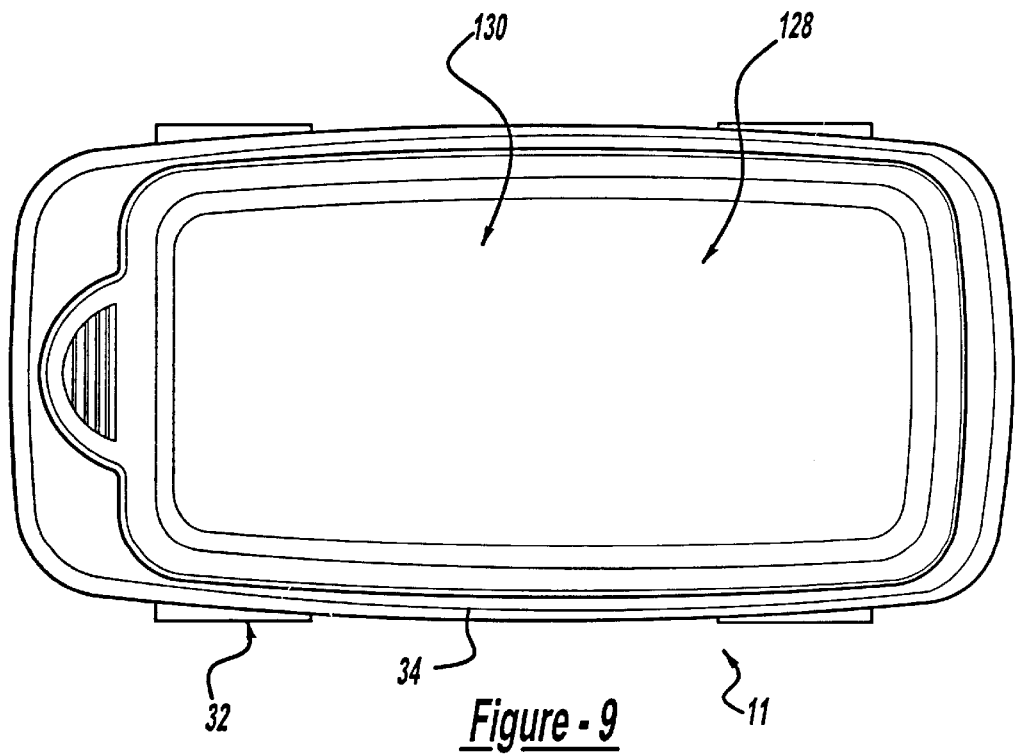
FIG. 9 is a top view of the mounting bracket and mounting bracket cover of FIG. 8, further illustrating a removable mat for use when the console assembly is not connected to the mounting bracket.

FIG. 9 depicts the base unit 11 as it would function without the attached console 10. The base plate cover 34 is selectively covered by a formed mat 128, made of a material such as a thermoplastic rubber. A recessed area 130 in the base plate cover 34 functions to hold various items (not shown) during vehicle operation.

Figures 10A, 10B:
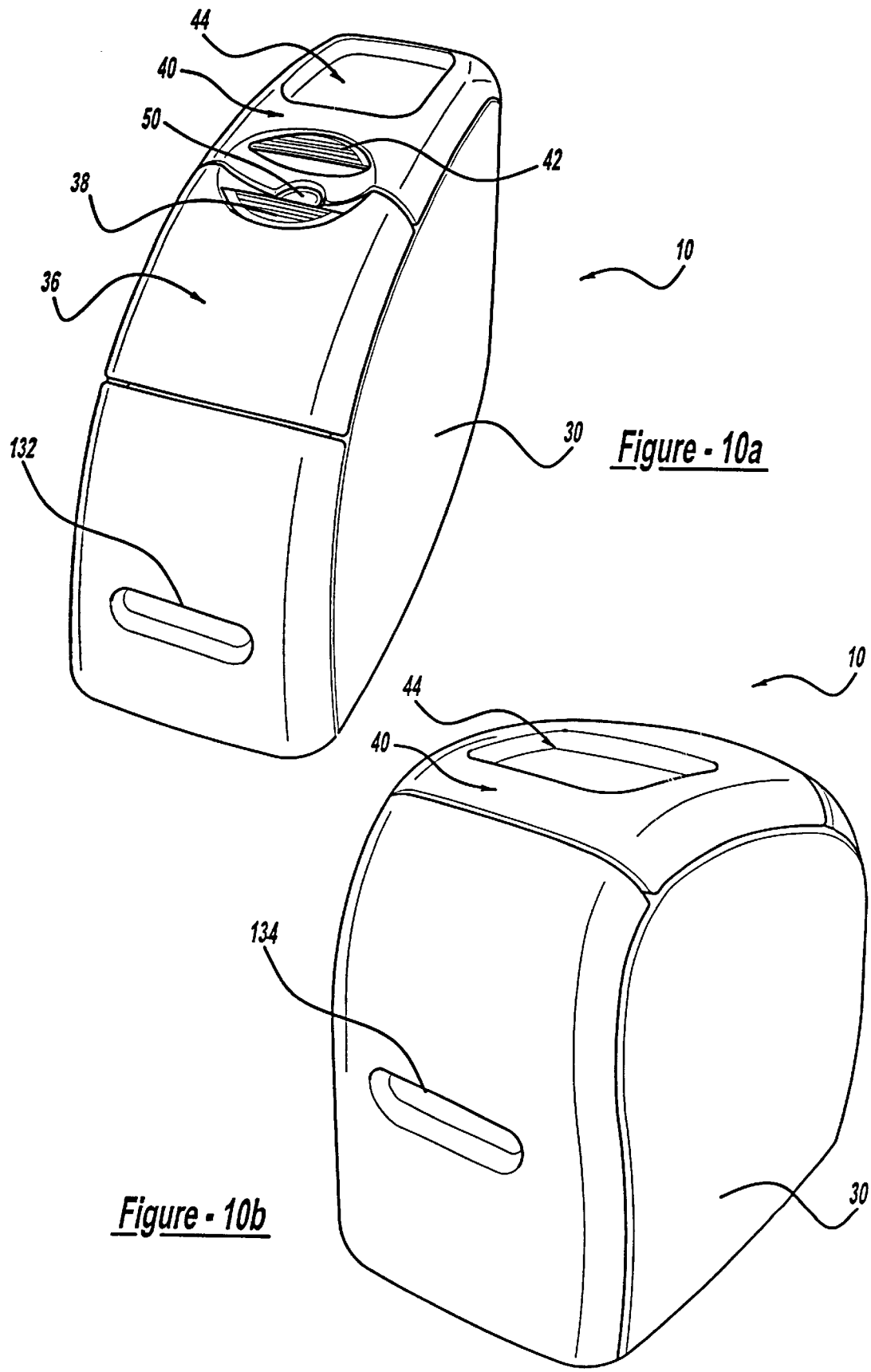
FIGS. 10a and 10b are front and rear perspective views, respectively, of the console assembly.

Front and rear views of the console 10 are shown in FIGS. 10a and 10b, respectively. As shown, the front face of the main body 30 includes a first recess 132, and the back face of the main body 30 includes a second recess 134. Used in conjunction, the first and second recesses 132, 134 serve as handles for holding the console 10 when not attached to the base unit 11.

Figure 11:
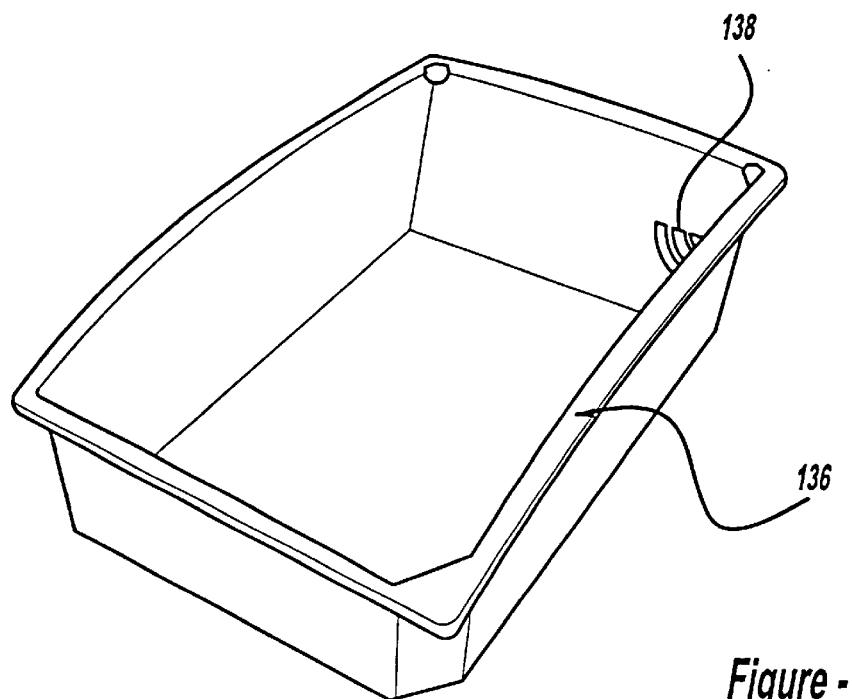
FIG. 11 is a perspective view of a removable tray for setting in the inner cavity of the console assembly.

FIG. 11 depicts a holder tray 136 which may be introduced into the first cavity 52. The holder tray 136 also has several openings 138 to allow light form the light 64 to pass through. Implementing the holder tray 136 enables items to be separated within the first cavity 52. The holder tray 136 is also shown in phantom in FIG. 5.

Figure 12:
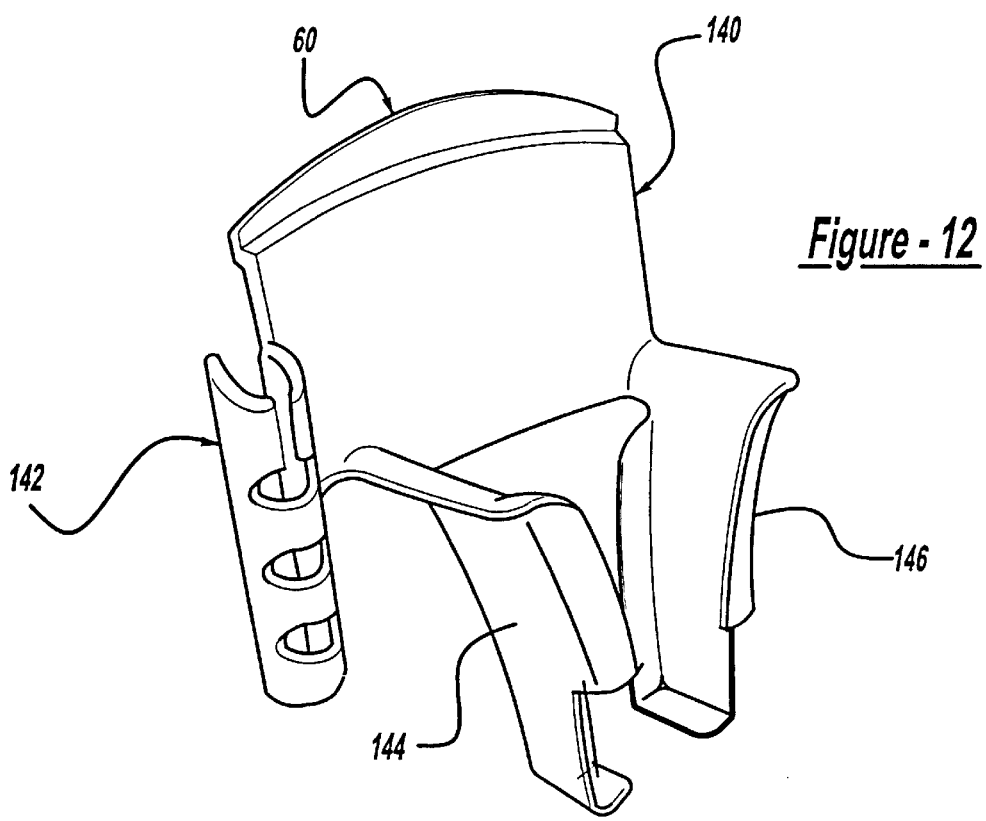
FIG. 12 is a perspective view of a removable bracket for holding a cellular telephone within the console assembly.

FIG. 12 shows the detachable cellular phone holder 60. The cellular phone holder 60 comprises two distinct portions which include a phone holding mechanism 140 and a pen holder 142. The phone holding mechanism includes first and second flexible retaining arms 144,146 which flex accordingly to hold varying sizes of cellular phones. The cellular phone holder 60 can be attached and removed from the interior of the second cavity 54 using a clip (not shown) that clips to a bar 61 (see FIG. 4) attached to the first panel 36.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A removable console assembly for a motor vehicle having a floor, the removable console assembly comprising:
   a main body defining an inner cavity, the main body having at least one open side;
   at least one panel providing access to the inner cavity;
   a latching arrangement including a handle for manually operating the latching arrangement, the handle disposed within the inner cavity; and
   a bracket assembly for attachment to the floor, the bracket assembly releasably receiving the main body and including:
      an electrical connection mechanism having a first member for permanent electrical connection with a battery of the motor vehicle and a second member selectively in electrical engagement with the first member;
      at least one mounting point for receiving the latching arrangement for holding the removable console assembly in position on the bracket assembly; and
      an electrical connector for selective electrical contact with said second member;
      wherein the console assembly is selectively releasable from the bracket, for one of either repositioning or removing the console assembly by operating the handle.

2. The removable console assembly of claim 1, wherein the second member of the electrical connection mechanism is slidably engaged with the first member and the electrical connection mechanism further includes:
   a first set of connection tabs disposed within the first member, the first set of connection tabs for permanent connection with the battery;
   a second set of connection tabs disposed on the second member; and
   at least one spring for biasing the second member in a first disengaged position such that the second set of tabs are out of electrical connection with the first set of connection tabs;
   wherein the second member is movable to a second engaged position such that the second set of tabs are in electrical connection with the first set of connection tabs.

3. The removable console assembly of claim 2, wherein the main body further includes at least one engagement post for positioning the second member in the second engaged position when the main body is received by the mounting bracket.

4. The removable console assembly of claim 1, further including a light disposed within the inner cavity.

5. The removable console assembly of claim 4, further including an electrical switch for selectively operating the light.

6. The removable console assembly of claim 1, further including a cellular phone holder disposed within the inner cavity.

7. The removable console assembly of claim 1, further including a tissue holder disposed within the inner cavity.

8. The removable console assembly of claim 1, further including a removable tray disposed within the inner cavity.

9. The removable console assembly of claim 1, further including a separation wall within the inner cavity, thus defining first and second sub-cavities within the inner cavity.

10. The removable console assembly of claim 1, further including an electrical connector disposed within the inner cavity.

11. The removable console assembly of claim 10, wherein the electrical connector is a 12-volt cigarette type connector.

12. The removable console assembly of claim 1, wherein the bracket assembly functions as a tray when said main body is detached.

13. A removable console assembly for a motor vehicle having a floor, the removable console assembly comprising:
   a main body defining an inner cavity, the main body having at least one open side;
   at least one panel providing access to the inner cavity;
   a latching arrangement including a handle for manually operating the latching arrangement, the handle disposed within the inner cavity;
   a bracket assembly for attachment to the floor, the bracket assembly releasably receiving the main body, the bracket assembly including at least one mounting point for receiving the latching arrangement for holding the removable console assembly in position on the bracket assembly; and
   wherein the console assembly is selectively releasable from the bracket by operating the handle, for one of either repositioning or removing the console assembly.

14. The removable console assembly of claim 13, further including a cellular phone holder disposed within the inner cavity.

15. The removable console assembly of claim 13, further including a tissue holder disposed within the inner cavity.

16. The removable console assembly of claim 13, further including a removable tray disposed within the inner cavity.

17. The removable console assembly of claim 13, further including a separation wall within the inner cavity, thus defining first and second sub-cavities within the inner cavity.

18. The removable console assembly of claim 13 further including an electrical connector disposed within the inner cavity.

19. The removable console assembly of claim 18 wherein the electrical connector is a 12-volt cigarette type connector.

20. The removable console assembly of claim 13 wherein the bracket assembly functions as a tray when said main body is detached.

* * * * *